(12) United States Patent
Ahmed

(10) Patent No.: US 8,710,379 B2
(45) Date of Patent: Apr. 29, 2014

(54) CHECK WEIGHER COMPRISING OF A ROTATING WEIGHING CHUTE WITH AN ACCUMULATING AND A DISCHARGE POSITION THAT CALCULATES FLOW RATE BY MEASURING WEIGHT ACCUMULATED DURING A PREDETERMINED TIME INTERVAL

(76) Inventor: Gulzar Ahmed, Tualatin, OR (US)

( * ) Notice: Subject to any disclaimer, the term of this patent is extended or adjusted under 35 U.S.C. 154(b) by 499 days.

(21) Appl. No.: 13/007,979

(22) Filed: Jan. 17, 2011

(65) Prior Publication Data

US 2011/0174552 A1    Jul. 21, 2011

Related U.S. Application Data (60) Provisional application No. 61/295,598, filed on Jan. 15, 2010.

(51) Int. Cl.
G01G 19/40 (2006.01)

(52) U.S. Cl.
USPC .............. 177/17; 177/105; 177/116; 177/145

(58) Field of Classification Search
USPC ..................... 177/105, 116, 119, 145, 16, 17
See application file for complete search history.

(56) References Cited

U.S. PATENT DOCUMENTS

| | | | | |
|---|---|---|---|---|
| 2,670,921 A * | 3/1954 | Dodd et al. | | 177/59 |
| 3,155,183 A * | 11/1964 | Bradford | | 177/162 |
| 3,695,371 A * | 10/1972 | Sheetz | | 177/59 |
| 4,570,419 A * | 2/1986 | Tinsley | | 53/473 |
| 4,660,664 A * | 4/1987 | Petersen | | 177/108 |
| 4,901,807 A * | 2/1990 | Muskat et al. | | 177/25.18 |
| 5,191,947 A * | 3/1993 | Petersen | | 177/25.18 |
| 5,341,307 A * | 8/1994 | Myhre et al. | | 700/240 |
| 5,780,780 A * | 7/1998 | Ahmed | | 177/119 |
| 6,462,288 B1 * | 10/2002 | Wong | | 177/105 |

* cited by examiner

Primary Examiner — Randy W Gibson
(74) Attorney, Agent, or Firm — J. Curtis Edmondson; Law Offices of J. Curtis Edmondson (57) ABSTRACT

A method and apparatus for checking the weighing one or more objects in a vibratory apparatus comprising the steps of accepting product into an in-line feeder to a discharge feeder without being weighed, determining an angle of decline of a fixed chute and a rotating chute based upon the flowing characteristics of the free flowing material being transferred, generating a sampling signal by a control system, the sampling signal causing the air cylinder to rotate the rotating chute in the position to capture the free flowing material and weighing the in-line sample for comparison purposes with the calculated weight.

9 Claims, 8 Drawing Sheets

CHECK WEIGHER COMPRISING OF A ROTATING WEIGHING CHUTE WITH AN ACCUMULATING AND A DISCHARGE POSITION THAT CALCULATES FLOW RATE BY MEASURING WEIGHT ACCUMULATED DURING A PREDETERMINED TIME INTERVAL

RELATED APPLICATIONS

This application is a continuation in part that claims the benefit of and priority to U.S. Provisional Patent Application 61/295,598 filed Jan. 15, 2010 the contents of which are hereby incorporated by reference.

BACKGROUND

This invention relates to a system of accuracy checking of the weight of objects measured by vibratory weighers (examples being weigh belts or the Magna Weigh® product as described in U.S. Pat. No. 5,780,780).

This application incorporates all material described in U.S. Pat. No. 5,780,780 (the '780 patent) issued on Jul. 14, 1998 to the applicant, the contents incorporated by reference.

It is often desirable to use vibratory weighers to measure the weight of a stream of bulk product. Variable speed conveyors have been used for this purpose, flow rate control being obtained by measuring the weight of objects as they are being transported on a conveyor of known length.

For example, vibratory weighers are transporting, for example, foodstuffs being unpackaged, peeled, cut or otherwise processed to expose edible surfaces (hereinafter "raw foodstuffs"). It is also particularly important when dispensing measured quantities of objects, for example, to obtain desired proportions by weight of one type of foodstuff to another. Therefore, it is generally desirable to measure the weight of objects, such as raw foodstuffs, on a typical belt type conveyor using a vibratory weigher.

Since vibratory weighers are the preferred method of weighing product that is continuously fed, is important that the vibratory wiegher have the capability of calibration and accuracy checking during operation. In certain situations, such as high volume production facilities, the ability to stop the flow of product, to calibrate the vibratory feeder, may result in considerable production loss.

SUMMARY

The present inventive subject matter overcomes problems in the prior art by apparatus, systems, and methods for checking the accuracy of vibratory weighing systems, in terms of weight per unit time, of free flowing products.

It is an object of this invention to provide a vibratory apparatus for checking the weight of product having a fixed weighing chute; said fixed weighing chute capable of handling product; a rotating weighing chute; said rotating chute mounted proximate to the fixed weighing chute, said rotating weighing chute capable of handling product; wherein the rotating chute further comprises an accumulating position and a discharge position; wherein said discharge position is capable of discharging product; a load cell; said load cell capable of measuring the weight of the product when the rotating chute is in the accumulating position; and an actuator; such that the actuator places the rotating chute in the accumulating position or the discharge position.

It is another object of this invention to provide a method for checking the weighing product on a conveying system having the steps of transferring product from an in-feed conveyor to a fixed weighing chute, raising a movable weighing chute from a discharge position to an accumulating position so that product is accumulated between the fixed weighing chute and the movable weighing chute; so that the weight of the accumulated product is measured; and lowering the movable weighing chute so that the accumulated product to a discharge conveyor.

The foregoing and other objects, features, and advantages of the invention will be more readily understood upon consideration of the following detailed description of the invention, taken in conjunction with the accompanying drawings.

DETAILED DESCRIPTION

Representative embodiments according to the inventive subject matter are shown in FIGS. 1-10, wherein similar features share common reference numerals. The prior art FIGS. 5 to 9 are shown for the purposes of illiustration of the prior art.

Figure 5A:
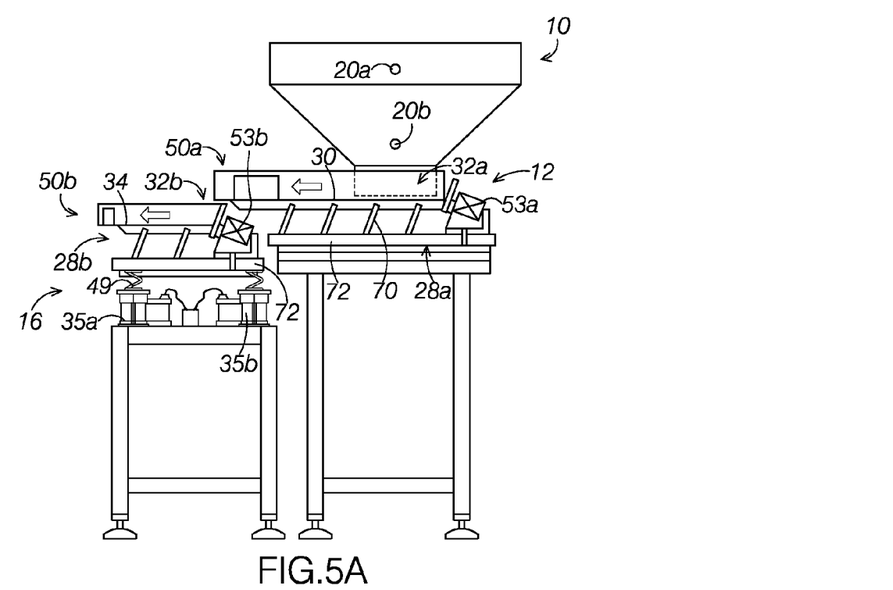
FIG. 5A is a prior-art side elevation of the prior art weighing vibratory apparatus.
Figure 5B:
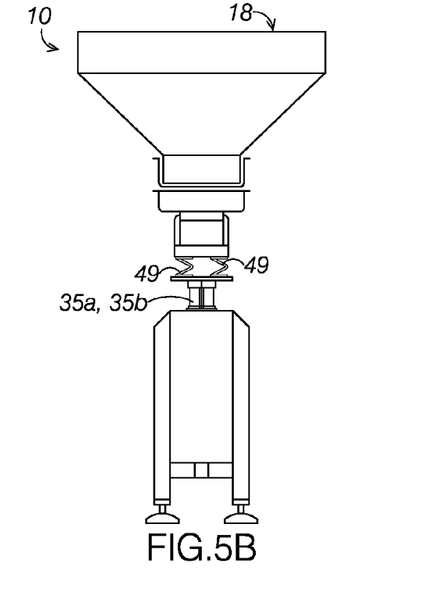
FIG. 5B is a prior-art end view of the apparatus of FIG. 5A.

For the purpose of illustrating the prior art and to illustrate certain common components, the prior art FIGS. 5A and 5B, depict embodiments of a weighing vibratory apparatus 10 according to the prior art that comprises an infeed vibratory conveyor 12 feeding a solid (hereinafter "bulk") product 14 (not shown) to a weighing vibratory conveyor 16. While a flow rate is generally desired for a stream of objects, the prior art may also be employed for use with only one or only a few objects without departing from the principles therefrom.

The conveyors 12 and 16 may be employed to convey the bulk product 14 from one location to another. However, the primary purpose of the conveyors for purposes of the invention is to establish a desired flow rate of the bulk product, for dispensation thereof in measured quantities.

The bulk product 14 may comprise any solid object such as foodstuffs, electrical and mechanical hardware, electrical and mechanical assemblies, and packaged goods. However, the apparatus 10 is particularly advantageous for dispensing raw foodstuffs. Moreover, one or more of the apparatus 10 may be employed, for example, for controlling the proportion of ingredients in a blend or mixture, such as seasoning on potato chips, additives in cereals, and mixed vegetables. The bulk product 14 is stored temporarily in a hopper 18 for feeding onto the infeed conveyor 12.

Figure 6:
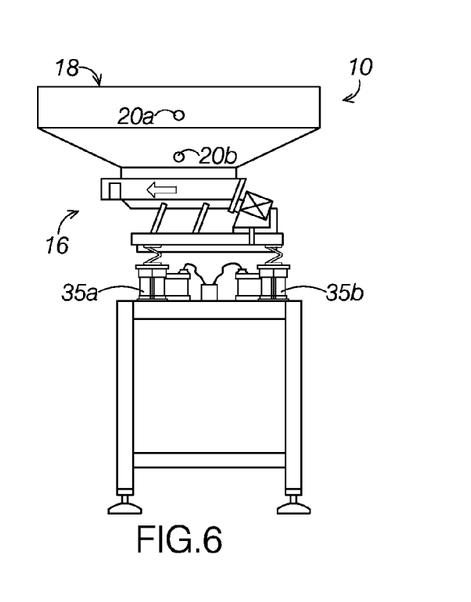
FIG. 6 is a prior-art side elevation of the alternate embodiment of the prior art weighing vibratory apparatus.

Referring to FIGS. 5A, 5B and 6, the hopper 18 includes a manually operated slide gate 24 (not shown) for adjusting the depth of the bulk product 14 on the infeed conveyor 12. The slide gate 24 provides a variable sized aperture 26 through which the bulk product is fed, preferably by force of gravity, onto the conveyor 12. Adjustment of the slide gate 24 in the present invention provides for a substantially fixed depth of bulk product 14 on the conveyor 12.

The hopper 18 also includes a high level sensor 20a and a low level sensor 20b of the level of bulk product 14. The high and low level sensors output respective high and low level sense signals 22a, 22b. The high level sense signal 22a is "true" when product is detected at the level of the sensor 20a. The low level sense signal 22b is "true" when product is no longer detected at the level of the sensor 20b. The sensors 20a and 20b may be, for example, photodetectors.

As illustrated in the prior art, the hopper is fed by an infeed means 17. The infeed means could be a human operator, but is preferably an automatic means for filling the hopper according to the high and low level sense signals 22a, 22b. The high and low level sense signals 22a, 22b are input to a controller 40 (described below) which outputs an infeed control signal 25 to the automatic infeed means in response thereto. In particular, the infeed means is switched off when the high level sense signal 22a is true and the infeed means is switched on when the low level sense signal 22b is true. Where the infeed means is a human operator, the controller 40 may provide the function of signaling the operator to feed the hopper 18 at intervals that assist to maintain product level in the hopper at the selected flow rate.

The conveyor elements 12, 16 employ respective vibratory conveyors 30, 34 which are adapted to convey the bulk product from respective entry ends 32a, 32b to respective exit ends 50a, 50b where the bulk product is dispensed. The conveyors 30, 34 are driven to have oscillatory, periodic movements so as to convey the objects. The periodic movements may be imparted by any number of methods—electrical, mechanical or electromechanical—known to those of ordinary skill in the mechanical arts. However, the periodic means are preferably obtained by applying a changing magnetic flux across a ferrous metal or other magnetically permeable material bridge 51 attached to the conveyors 30, 34 or, alternatively, forming part or all of the conveyors 30, 34.

Respective variable magnetic field drive units 53a, 53b are employed to provide the changing magnetic flux wherein the time rate of change of the magnetic flux is substantially synchronous with and proportional to desired periodic movements of the conveyors. A preferred embodiment of the drive units 53a, 53b for use with the present invention is marketed by Crescent Systems, Inc. of Tualatin Oreg., under the trademark EMTECH. The drive units 53a, 53b have a stroke that is variable with power supplied thereto.

The conveyor 30 receives the bulk product 14 from the hopper 18, and the conveyor 34 receives the bulk product from conveyor 30. Both the conveyors 30, 34 come into physical contact with the bulk product. Therefore, it is preferable that the conveyors 30, 34 are especially adapted for ease and maintenance of sanitation. The conveyors 30, 34 are preferably formed so as to have smooth surfaces for cleaning and are preferably formed of a material, such as aluminum or stainless steel, that will not chemically react with the bulk product or cleaning agents. Alternatively, the conveyors 30, 34 may be plated or coated with one or more such materials as are known to those ordinary skill which are particularly adapted for being maintained in a sanitary condition, such as Teflon. The conveyors 30, 34 may be adapted for easy removal and replacement onto the respective infeed vibratory conveyor 12 and weighing vibratory conveyor 16. However, due to the vibrations of the conveyors 30, 34, it is preferable to bolt the conveyors rigidly to the respective infeed vibratory conveyor and the weighing vibratory conveyor.

Movement of the bulk product 14 along the conveyors 30, 34 may be with the assistance of gravity, obtained by slightly angling the conveyors with respect to the horizontal. However, to provide for optimum flow control it is advantageous to employ substantially horizontal vibratory conveyors 30, 34. Particularized oscillatory movements are then imparted to the conveyors to move the product thereon in a preferred direction.

Figure 7:
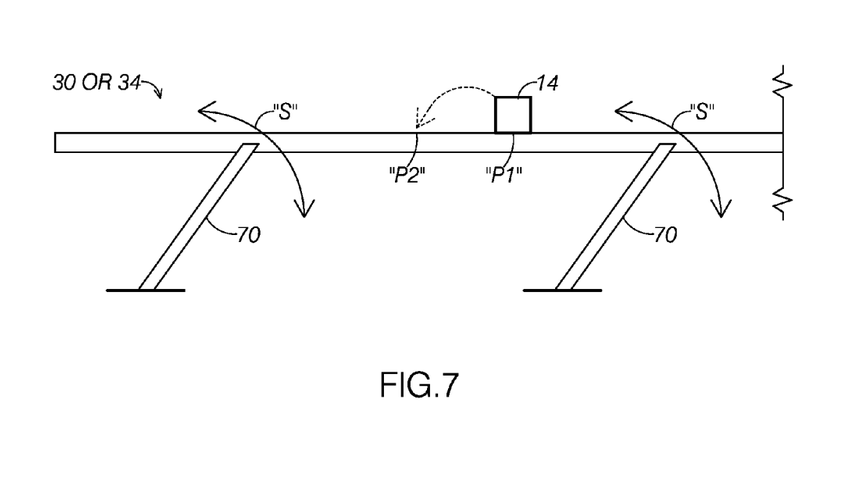
FIG. 7 is a prior-art schematic of an object being moved along a conveyor according to the present invention.

Now referring to the prior art FIG. 7, leaf springs 70 associated with the conveyors 30, 34 connect the conveyors to respective pedestals 72. The leaf springs permit, by bending, movement of the conveyors in a small arc "s" defined by the length of the springs 70. For feeding the bulk product 14 in a forward direction, the springs are angled with respect off the vertical so that forward motion of the conveyor causes the conveyor to rise upwardly and forwardly along the arc while reverse motion of the conveyor causes the conveyor to fall backwardly and downwardly along the arc. As the conveyor 30 or 34 rises upwardly and forwardly, it launches bulk product located at a location "P1" thereon upwardly and forwardly off of the conveyor. As the conveyor is brought backwardly and downwardly, the product is allowed to fall at a location "P2" on the conveyor that is in the forward direction with respect to the location "P1". Repeated cycles move the product in steps along the conveyor.

The leaf springs 70 are, preferably, formed of fiberglass; however, steel or other spring-material may be employed as well. It can be seen that the mass sprung with the leaf springs generally includes the mass of the conveyor and pedestal 72 as well as the mass of the product 14 therein or thereon at the operating product flow rate. The values of the springs 70, i.e., their spring constants, together with the sprung mass, provides for a natural resonance frequency of the associated conveyor 30 or 34. The natural resonance frequency is preferably made to match the frequency of the associated drive unit 53a, 53b, by varying any or all of the spring values, the sprung mass, and the drive frequency, as well as other masses, compliances and dampings in the apparatus 10 (together, hereinafter "system parameters"). This allows for a minimum power consumption in the apparatus 10.

The conveyor 34 is coupled to a weight measuring apparatus 36. The weight measuring apparatus preferably comprises two, spaced-apart load cells 35a, 35b; however, any number of load cells or other force measuring apparatus may be used, including one load cell or other force measuring apparatus, without departing from the principles of the invention.

Figure 8:
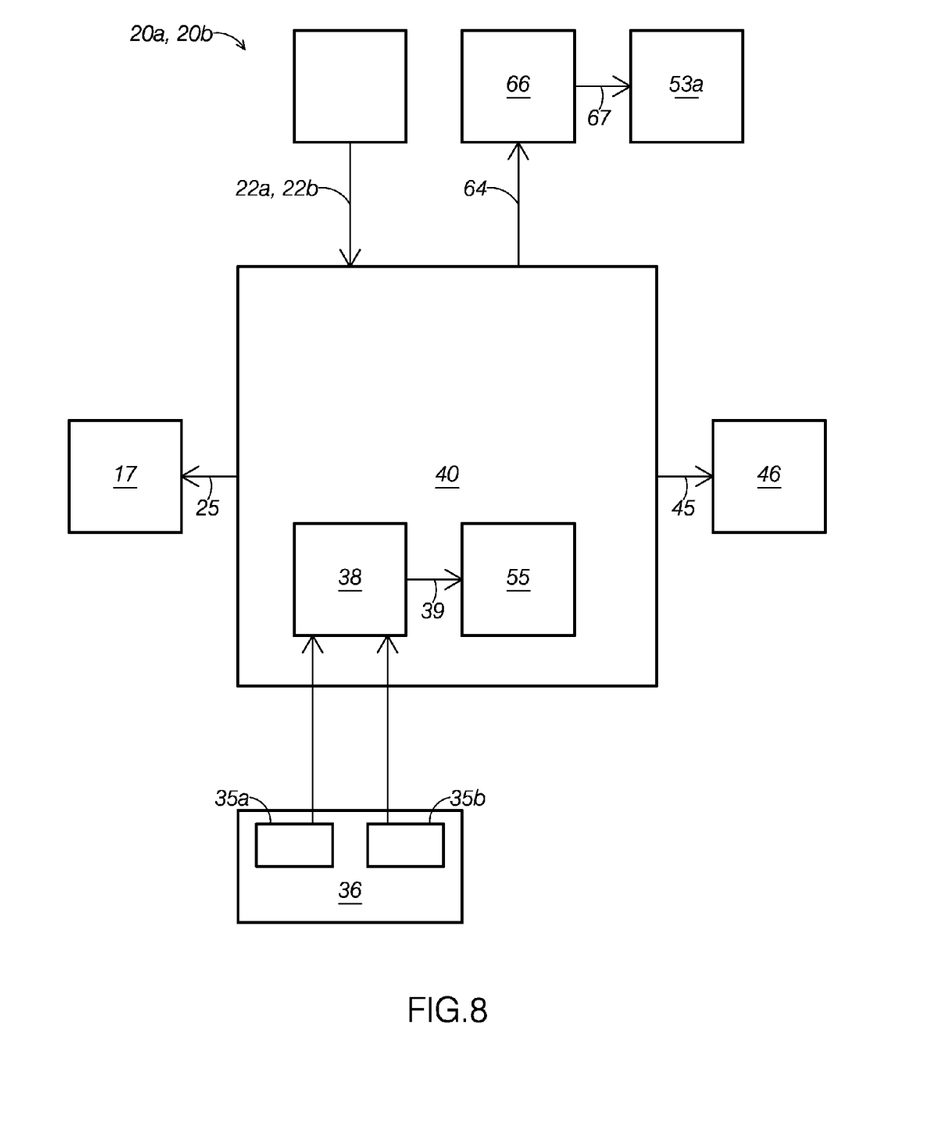
FIG. 8 is a prior-art schematic view of the prior art controller according to the present invention.

The load cells 35a, 35b provide force measuring outputs 36a, 36b which are connected to a summing circuit 38 in the controller 40 for creating a weight sum signal 39. The load cells preferably have a sufficiently high frequency response to respond to anticipated changes in product weight or rate of flow. However, the load cells are also preferably damped sufficiently to minimize their response to the frequencies of vibration of the conveyor 34. A preferred load cell is the TEDEA Model 1010, marketed by Tedea Huntleigh International Ltd. of Herzuya, Israel under the trademark TEDEA TH HUNTLEIGH. This load cell has a 5 kg capacity and has a typical settling time of 100 to 150 milliseconds. The preferred load cells 35a, 35b are provided with a silicone or other viscous fluid coupling that effect a desirable mechanical damping. The preferred load cells also incorporate adjustable springs to tare out the weight of the conveyor 34 so that the outputs 36a, 36b represent substantially the weight of the bulk product 14.

The pedestal 72 is preferably coupled to the weight measuring apparatus 36 through compression springs 49, to provide additional mechanical isolation of the load cells 35a, 35b from the periodic movements of the conveyor 34. The values of the compression springs 49 preferably provide for about a ten-fold attenuation of the amplitude of vibration of the conveyor 34 at the drive frequency of the drive units 53a, 53b. However, the amount of isolation desired of the compression springs is a determination that must generally be made in consideration of all of the system parameters and is generally a matter of trial and error owing to the dynamic complexity of the apparatus 10.

The weight sum signal 39 is an indication of flow rate of the product 14. That is, the rate of flow of the product 14 is proportional to the weight of the product 14 as indicated by the weight sum signal, multiplied by the speed of the conveyor and divided by the length of the conveyor. Preferably, in addition to the aforementioned mechanical damping, the controller 40 employs a filter 55 for filtering the high frequency components of the weight sum signal 39, wherein high frequency components are defined to be at a frequency that is about ten times faster than the rate of change of product weight encountered during operation of the apparatus 10. Of course, a filter 55 having a sharper frequency cut-off may be employed if necessary, to pass frequencies in the weight sum signal that are closer to the vibration frequencies.

To obtain a desired set-point value of flow rate, the controller 40 adjusts the speed of travel of product on the conveyor 30 ("speed of the conveyor") of the infeed conveyor 12. An infeed infeed vibratory drive signal 64 is output from the controller as input to a drive amplifier 66. The drive amplifier 66 supplies sinusoidal, variable ac power 67 to the drive unit 53a at the frequency set by the controller through the signal 64, the variable power varying the magnitude of the stroke of the drive unit to provide a variable speed of the conveyor 30 as well as a substantially constant depth of the product 14 thereon. However, the speed of the conveyor 30 may be varied by varying the frequency of the power to the drive unit 53a without departing from the principles of the invention.

The drive unit 53b preferably drives the weighing vibratory conveyor 12 at a constant speed and, therefore, provides for a variable depth of the product 14 thereon. The controller 40 may include a feed-back circuit (not shown) for maintaining a constant power to the drive unit 53b, thereby controlling the stroke thereof and consequently the speed of the conveyor 30.

The controller 40 also, preferably, outputs a display signal 45 to a display 46 the instantaneous product weight on the conveyor 34 and the total product weight having passed over the conveyor 34, the information being updated at selected time intervals.

Figure 9:
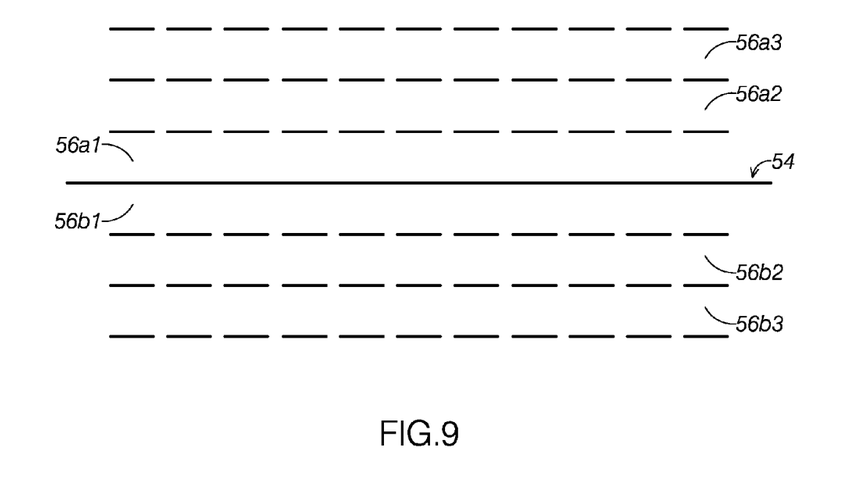
FIG. 9 is a prior-art pictorial representation of a control scheme according to the prior art invention.

Referring to prior art FIG. 9, a simple control scheme implemented in the controller 40 has been found sufficient to maintain the desired, set-point flow rate under most circumstances of operation of the apparatus 10. FIG. 9 depicts a target set-point 54 and zones 56a1, 56a2, 56a3; 56b1, 56b2, 56b3 wherein the measured flow rate deviates from the desired set-point 54. Particular values for the set-point 54 and the zones of deviation 56a1-56b3 would need to be determined experimentally, for each product 14, so that the apparatus 10 has an acceptably fast response without becoming unstable.

If the measured flow rate is in zones 56a1 or 56b1, a small magnitude correction is made to the conveyor speeds to bring the measured flow rate to the set-point 54. However, if the flow rate is determined to be in either zones 56a2 or 56b2, a larger magnitude correction is made to bring the measured rate into zones 56a1 or 56b1, respectively. Similarly, if the flow rate is determined to be in either zones 56a3 or 56b3, an even larger magnitude correction is made to bring the measured rate into zones 56a2 or 56b2, respectively. While the zones are shown as being substantially the same size in FIG. 9, the zones can be of different relative sizes without departing from the principles of the invention.

Now referring to prior art FIG. 6, a second embodiment of an apparatus for monitoring and controlling the flow rate of a stream of bulk product according to the present invention 10 is shown. Instead of using an infeed vibratory conveyor 12 to feed the weighing vibratory conveyor 16, an infeed hopper 18 is directly installed on the weighing vibratory conveyor. In this embodiment, the load cells 35a, 35b weigh the contents of the hopper 18 in addition to the product 14 that is on the conveyor 34. Thence, the system is arranged to adjust flow rate by the loss in weight of the system as product is conveyed off the apparatus 10.

The product 14 is fed to the hopper 18 by the aforementioned infeed means until the high level sensor 20a indicates the hopper is full. The high level sense signal 22a becomes "true." The controller 40 outputs the infeed control signal 25, in response to the signal 22a, to signal the shutting off, or to shut off, the infeed control means. The conveyor 34 carries off some of the product 14 and a rate of weight loss is computed by the controller 40 in response to the change in the weight sum signal 39 over an interval of time, preferably measured by a clock internal to the controller. The controller then varies the speed of the conveyor until the rate of weight loss is equal to the desired, set-point flow rate.

After some time during which product is being conveyed out of the apparatus 10, the low level sensor 20b will sense a low level of the product 14 at the sensor 20b. The low level sense signal 22b becomes "true." The controller 40 ceases to adjustably control the speed of the conveyor, leaving the speed substantially equal to what it was when the low level was reached. The controller outputs the infeed control means signal 25, in response to the signal 22b, to signal the switching on, or to switch on, the infeed control means, to fill the hopper 18. The conveyor continues to run at the aforementioned speed until the high level sensor indicates that the product is filled to the high level after. Thereafter, the aforementioned cycle is repeated.

Referring to FIG. 6, a second embodiment of an apparatus for monitoring and controlling the flow rate of a stream of bulk product according to the present invention 10 is shown. Instead of using an infeed vibratory conveyor 12 to feed the weighing vibratory conveyor 16, an infeed hopper 18 is directly installed on the weighing vibratory conveyor. In this embodiment, the load cells 35a, 35b weigh the contents of the hopper 18 in addition to the product 14 that is on the conveyor 34. Thence, the system is arranged to adjust flow rate by the loss in weight of the system as product is conveyed off the apparatus 10.

Now referring to the inventive subject matter as illustrate in FIG. 1 through FIG. 4 which depict the improved embodiments of the device as previously illustrated and discussed in FIGS. 5-9.

In the preferred embodiment, the enhancement is to check the flow rate, in terms of weight per unit time, of free flowing products. This may apply to feeders which feed products volumetrically or check the flow rate of products being dispensed gravimetrically. In the case of volumetric feed systems it is desirable to check the feed rate by weight as different products may have different flow rates since the bulk densities of products differ. As a consequence, for the same volumetric feed rate various products would have a different feed rate by weight.

Without the novel improvements as shown in FIGS. 1-4 and 10, the product will go on to a process line (not shown) or a take-away conveyor (aka discharge feeder) 160. The transfer of product directly from the infeed feeder conveyor 110 to the take-away conveyor 160 usually does not allow the operator of the conveyor to know what actual feed rate the product 150 is being dispensed at. It is, therefore, desirable to check the feed rate to know the feed rate, by weight as the product is moved along the conveyor. Usually, the measurement of the product 150 is not performed; in which case the product being transported on the conveyor may experience variations in product flow. Alternately if the measurement of the product on the conveyor is performed manually, samples are manually taken to determine the actual flow rate of product, by weight. This manual sampling of product is expensive in terms of time, and potentially error prone.

For consistent product quality it is important that the feed rate is accurate. An application may require cooking, drying, blanching, mixing, seasoning, or blending of various products in desired proportions. For the sake of uniformity and superior product quality, it is desired that the feed rate may be maintained very accurately. Many applications may have weighing means including Weigh Belts or Magna Weigh (U.S. Pat. No. 5,780,780) to control the feed rate. However, there is no independent checking system to assure the feed systems are dispensing the product as desired. In these cases, this device shall provide an independent check to inform the operators if these feeders are working properly and/or automatically apply a correction to these feeders to align actual feed rate with the set point. It also would eliminate the need to manually check the performance of these feeders, which is labor intensive and not as accurate. For those not using weighing feeders, it may be a useful tool to inform what the actual production rate is, and provide a rough estimate of total amount of product fed to a process line in an hour, in a shift, in a day, or in any length of time desired.

In the case of feeders which feed products by weight. The present preferred embodiment as illustrated by the enhancements as shown on FIG. 1 through FIG. 4 provides an enhanced independent check to ensure the feeders are feeding the same as the set point. If the feeders are not feeding at the set point, then the improved device, as illustrated on FIG. 1 through FIG. 4 may issue a signal so that the feeder may automatically correct the feed rate to comply with the set point.

Figure 1:
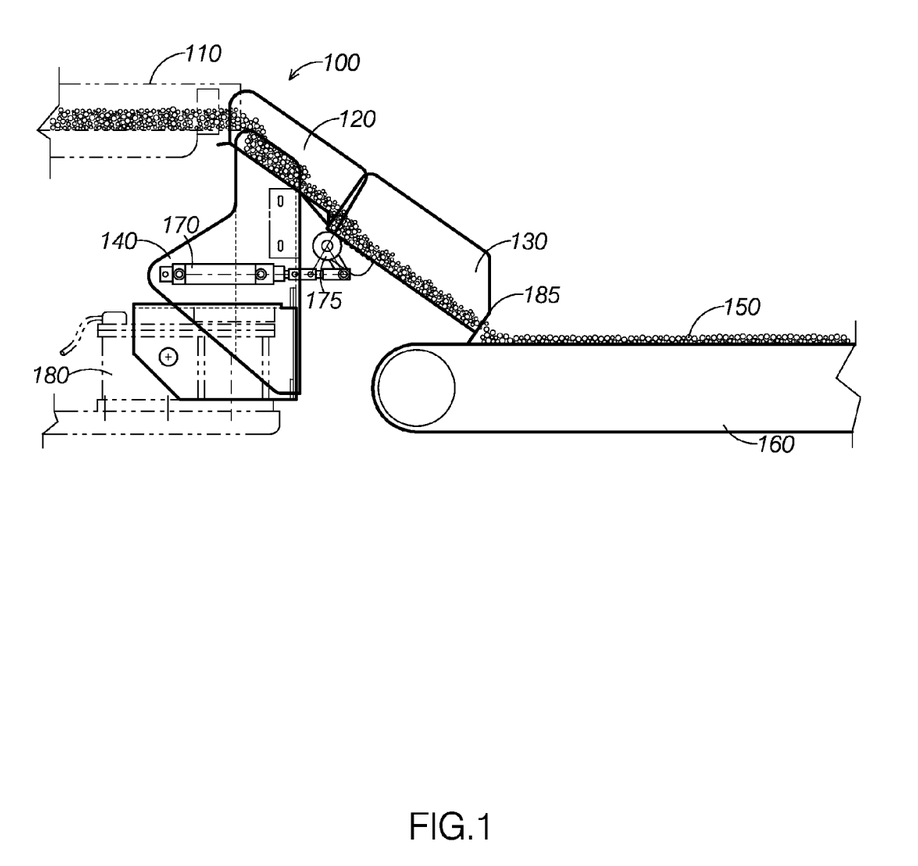
FIG. 1 is a diagram of a vibratory weighing device showing an infeed conveyor connected to a take-away conveyor.

Now referring to FIG. 1, which depicts the various components of this device. The infeed feeder conveyor 110 is depicted as a belt, but may be a volumetric feeder, weigh belt, or a vibratory weigh feeder. The infeed feeder conveyor 110 feeds product 150 to a process line at a given volumetric or gravimetric rate, in the direction shown by the arrow 115.

Now referring back to FIG. 1. The inventive subject matter is placed between the infeed feeder 110 and discharge feeder 160. The inventive subject matter consists of a fixed weighing chute 120 and a rotating weighing chute 130 that is used to convey product 150 from the infeed feeder 110 to the discharge feeder 160. The infeed feeder 110 and the discharge feeder 160 are mounted on a feeder support bracket 140. A check load cell 130 is mounted at the base of the feeder support bracket 140. The fixed weighing chute 120 is mounted at the top of the feeder support bracket 140. To the right of the feeder support bracket 140 is an actuator 170. The actuator 170 is connected to the rotating weighing chute 130 to rotate. This rotation either causes product 150 to accumulate or to be discharged during normal operation.

The materials used to construct the fixed weighing chute 120, the rotating weighing chute 130, the feeder support bracket 140 should be clear to those skilled in the arts. For example these materials may be made from metal, wood, and/or plastic, depending on the specific requirements of the weighing application and the type of product 150.

The operation of the inventive subject matter may be regulated by a control system 1000 (See FIG. 10) which may consist of a load cell reading device 1040 to determine the weight of product on the fixed weighing chute 120 and the rotating weighing chute 130, a timing device (1060) to check the time during which the weight is to be sampled, a check computing device (1010) to compute feed rate, by weight, an output (1050) to control the solenoid which will control the actuator 170 for a given amount of time, and the means to transfer this rate information to the feed system to correct the feed rate, if desired. Those skilled in the arts will recognize that there are a variety of computers which may be programmed to act as a control systeml. The existing control system 40 of the as illustrated in FIG. 8 may also be used to perform this function. Or there may be an independent control system wholly dedicated to operate this device.

In normal operation the product will flow from the in-feed feeder 110 to discharge feeder 160 without being weighed. The angle of decline of the fixed chute 120 and the rotating chute 130 shall be determined based upon the flowing characteristics of the free flowing material being transferred. As a timing sampling signal 1050 is generated by the control system 1010 to (which can be any interval programmed in the control system) the actuator 170 shall rotate the rotating chute 130 to the measuring position 210 as shown on FIG. 1. The control system then shall zero the weight on fixed chute 120 and rotating chute 130. With the rotating chute 130 in the measuring position, the product 150 will start to accumulate 220 between the fixed chute 130 and rotating chute 140. The control system 1010 shall determine the accumulated weight on the fixed chute 120 and rotating chute 130 after a time interval (which is to be programmed in the control system 1010) and determine the flow rate by dividing the weight of product accumulated in the chutes with the interval time to obtain flow rate in lbs/min, Kg/min, or any other desired units. As this is being calculated the control system shall rotate the rotating chute 130 back to its original position 320 (See FIG. 4) to dump the accumulated product onto the discharge feeder 160 and resume normal operation.

Figure 10:
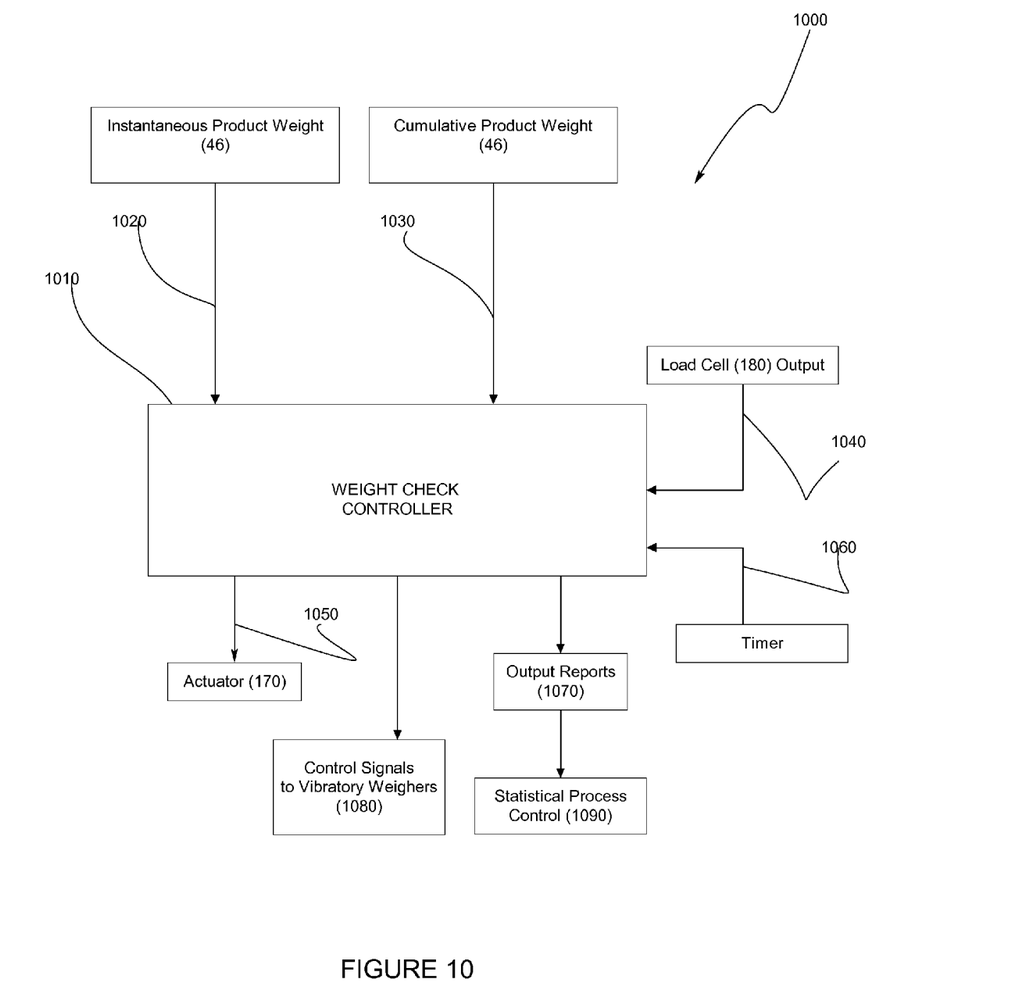
FIG. 10 is a block diagram of the controller and pertinent interfaces.

The feed rate information thus obtained by the control system 1010 may be utilized in various ways. It may be reported to operators 1070 via a display for their information to know what feed rate is being dispensed to the line. The operators in the case of volumetric feeders may manually change the speed of the infeed feeder 110 to increased or decrease the flow rate as required. This information may also be sent to the control system of the weigh belt or the or other types of vibratory weighers 1080, in case these feeding means were being used, to automatically apply correction to bring the actual feed rate in line with the set point feed rate. Either one or several readings may be taken in succession to determine an average feed rate or other statistics 1090 for any one sample.

This process of sample taking and rate determination shall continue as the product flow continues or the process is manually stopped by an operator. This device may be applied to any dry, free flowing product including food materials, grains, aggregate, or grass seeds.

Figure 2:
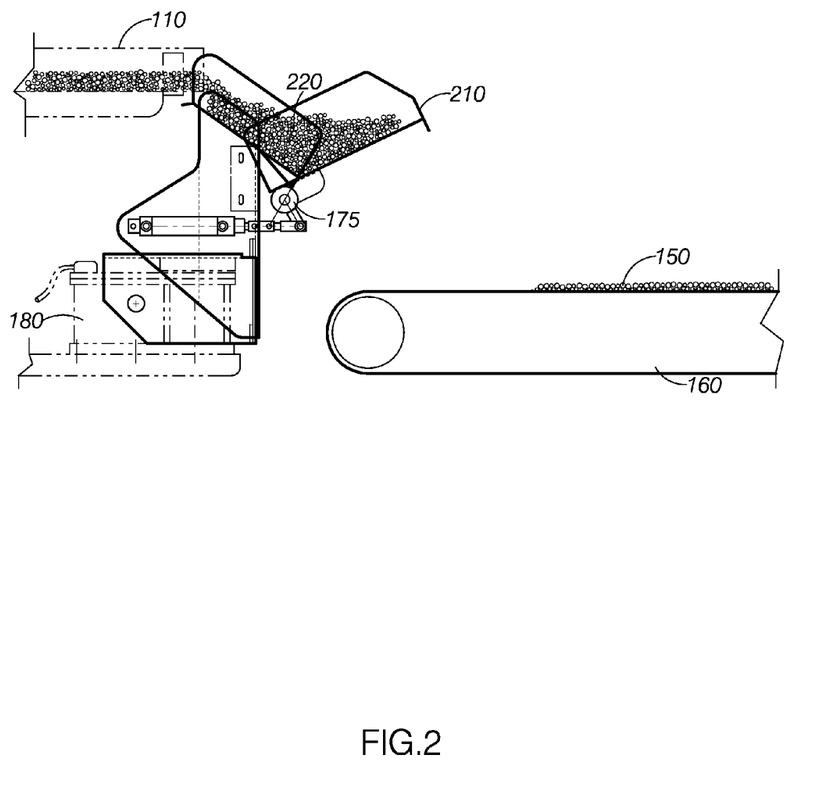
FIG. 2 illustrates the raising of the lower chute to capture a quantity of material to be weighed.
Figure 3:
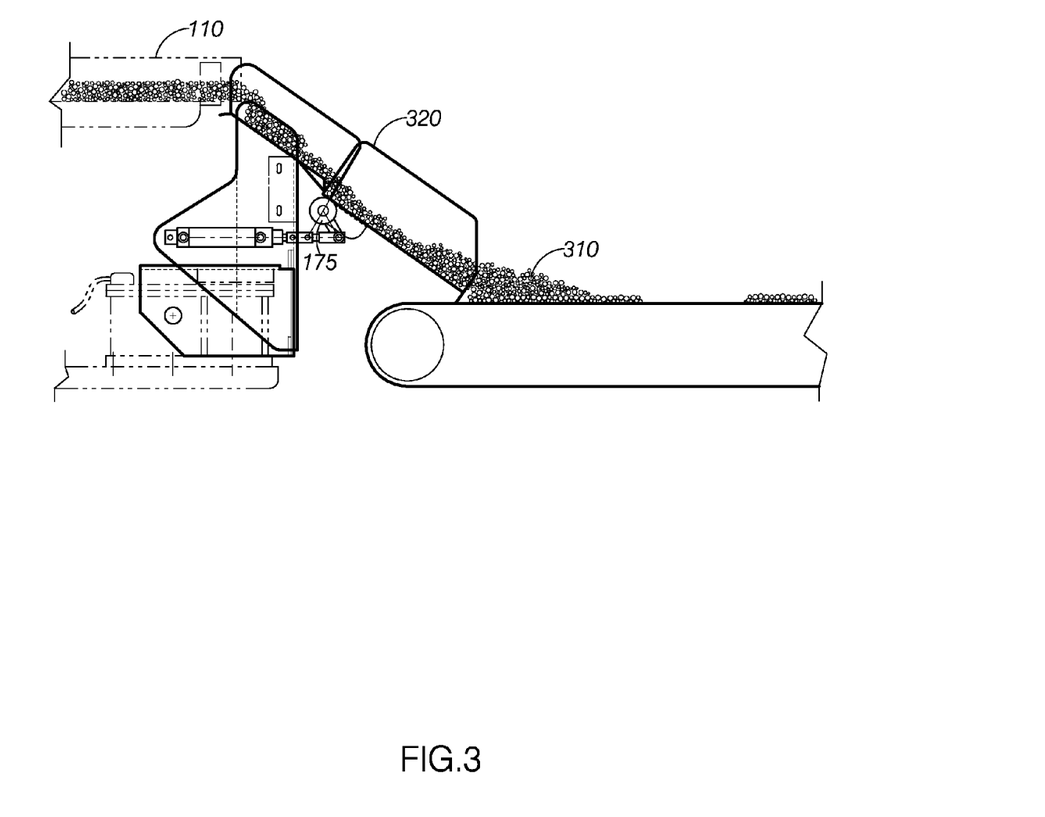
FIG. 3 illustrates the lowering of the lower chute to release the captured material that has been weighed.
Figure 4:
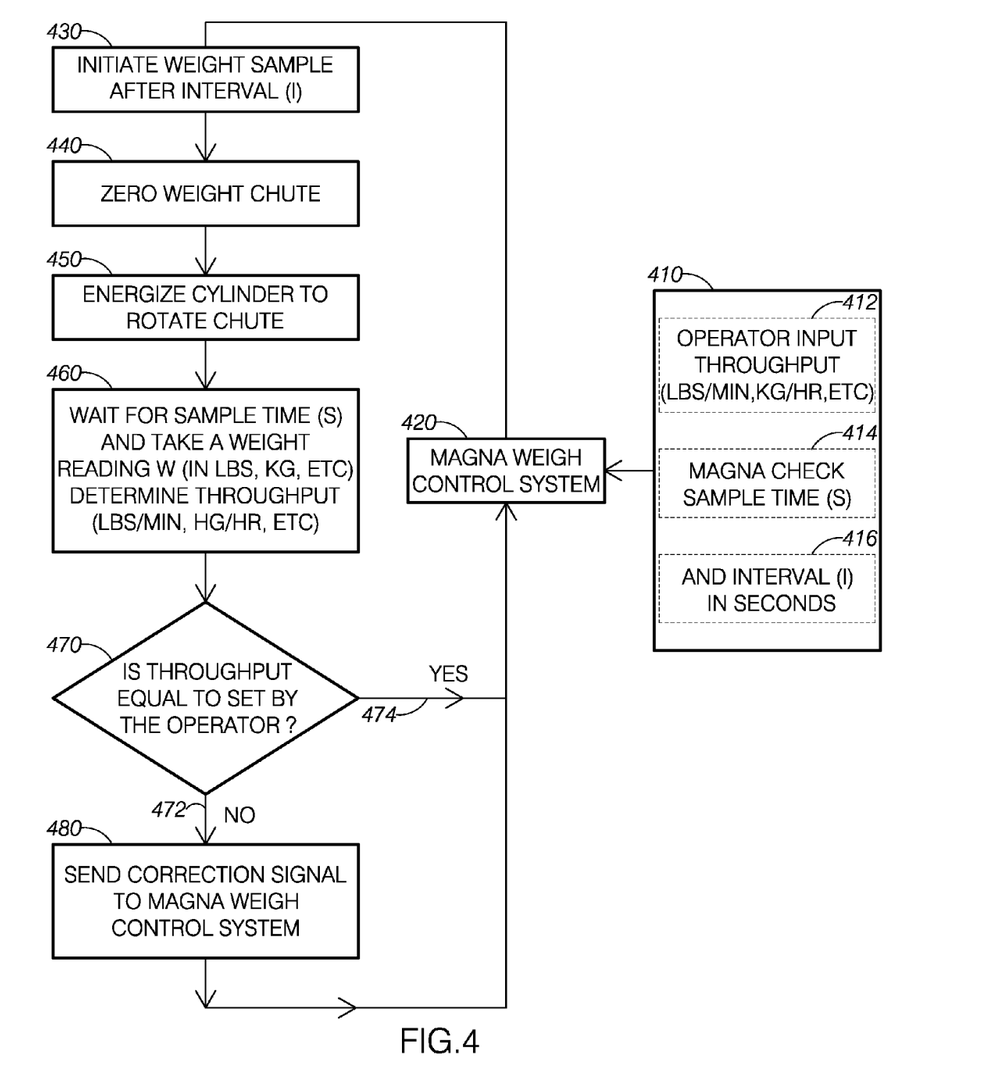
FIG. 4 is a flow diagram of the measuring process.

FIGS. 2, 3, and 4 show the device in normal operating mode, weighing mode, and reverting back to normal mode. As indicated before, this device may be used independently to check the flow rate or in conjunction with a weight belt or the Magna Weigh.

Now referring to the load cell 180. The load cell 180 can be any high resolution load cell, but one embodiment uses Tedea Model 9010 as representative load cell. This load cell can support a 3 Kg capacity with 10 Kg offset to cancel out the weight of the chutes. The load cell 180 only measures the weight of the product being weighed, for enhanced accuracy. This is similar to one of the possible load cell variations as described in the prior art.

Now referring to the actuator 170 which can be an air cylinder. Any appropriate air cylinder may be used, for example, a Numatic Model 0750D02-01I. This is with 0.75" bore and 1" stroke. However, the size of the cylinder will vary according to the size of the device. This device shall be designed to suit product being weighed as well as the production rate of the product. As such the device may accommodate from a few pounds to several hundred pounds depending upon the dictates of the application and the product being processed.

Likewise, the solenoid valve which is used to supply air to the air cylinder. For this particular embodiment the Numatics 031SA4412000030 was used. The particular solenoid uses 110 VAC and is actuated by the control system 1010.

The inventive subject matter also utilizes a control system 1010 to control the actuators and weighing devices. In one particular embodiment case a control system 1010 used is the Allen Bradley SLC 504 PLC with EZ Touch screen.

In a typical operational scenario the inventive subject will weigh running dried macaroni (e.g., processed pasta) at the rate of 1 to 2 lbs/min.

It is to be recognized that, while specific embodiments of a weighing vibratory apparatus and method have been shown as preferred, other configurations could be utilized, in addition to configurations already mentioned, without departing from the principles of the invention. For example, while two forms of mechanical damping in combination with electrical damping has been described as being preferred, less damping may be sufficient depending on system parameters. Any one of the aforementioned damping mechanisms may be employed alone or in combination with any other of the mechanisms without departing from the principles of the invention. In general, selecting the type and amount of damping required for a given product and desired flow or dispensation rate will depend on a comprehensive consideration of the apparatus, loaded with product, as a whole, and will be found by trial and error.

The terms and expressions which have been employed in the foregoing specification are used therein as terms of description and not of limitation, and there is no intention of the use of such terms and expressions of excluding equivalents of the features shown and described or portions thereof, it being recognized that the scope of the invention is defined and limited only by the claims which follow.

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

All patent and non-patent literature cited herein is hereby incorporated by references in its entirety for all purposes.

I claim:

1. A weigher apparatus, comprising:
   a fixed weighing chute; said fixed weighing chute capable of handling product;
   a rotating weighing chute; said rotating chute mounted proximate to the fixed weighing chute, said rotating weighing chute capable of handling product; wherein the rotating chute further comprises an accumulating position and a discharge position; wherein said discharge position is capable of discharging product;
   a load cell; said load cell capable of measuring the weight of the product when the rotating chute is in the accumulating position;
   a timer, said timer capable of periodically raising and lowering the rotating chute from the accumulating position to the discharge position;
   a controller, said controller capable of measuring the weight of the product, wherein said controller averages successive weights of the product;
   and an actuator; such that the actuator places the rotating chute in the accumulating position or the discharge position.

2. The weigher apparatus of claim 1, further comprising:
   a comparator, said comparator having an actual weight measurement input,
   a target weight measurement input, and
   a differential output, where the differential output is the difference between the actual measurement input and the target weight measurement input.

3. The weigher apparatus of claim 2, further comprising:
   a threshold indicator, said threshold indicator being activated where the differential output exceeds a set threshold value.

4. The weigher apparatus of claim 2, further comprising:
   the fixed weighing chute is coupled to an infeed conveyor wherein, the product is received by the fixed weighing chute from the infeed conveyor.

5. The weigher apparatus of claim 2, further comprising:
   the rotating weighing chute is coupled to a discharge feeder wherein, the product is delivered to the discharge feeder from the rotating weighing chute.

6. The weigher apparatus of claim 1, wherein said actuator is an air cylinder.

7. The weigher apparatus of claim 1, wherein said actuator is activated by said controller.

8. A method for checking the weight of a free flowing product on a conveying system comprising the steps of:
   transferring the product from an in-feed conveyor to a fixed weighing chute;
   raising a rotating weighing chute from a discharge position to an accumulating position;
   accumulating the product in the fixed weighing chute and the rotating weighing chute;
   determining by a control system the accumulated weight on the chutes; said determinations being made after a time interval, which is to be programmed in the control system, and calculating the flow rate by dividing the weight of product accumulated in the chutes with the interval time to obtain flow rate in lbs/min, Kg/min, or any other desired units; and
   lowering the rotating weighing chute back to its original position to dump accumulated product onto a discharge feeder and resume operation of free flowing product.

9. The method for checking the weight of a free flowing product on a conveying system according to claim 8 further comprising the steps of:
   zeroing the weight of the fixed weighing chute and the rotating weighing chute in the control system.

* * * * *